United States Patent [19]
Nihei et al.

[11] Patent Number: 5,918,953
[45] Date of Patent: Jul. 6, 1999

[54] ANTILOCK BRAKE SYSTEM CONTROL APPARATUS

[75] Inventors: Toshihisa Nihei, Mishima; Hiroyuki Matsubayashi, Susono; Koichi Kondoh, Kasugai; Hiroyuki Nagai, Nagoya; Yasunori Sakata, Toyota, all of Japan; Satoshi Itabashi, Phoenix, Ariz.

[73] Assignees: Toyota Jidosha Kabushiki Kaisha, Toyota; Aishin Seiki Kabushiki Kaisha, Kariya, both of Japan

[21] Appl. No.: 08/749,644

[22] Filed: Nov. 15, 1996

[30] Foreign Application Priority Data

Nov. 20, 1995 [JP] Japan ..................................... 7-301167

[51] Int. Cl.$^6$ ...................................................... B60T 8/58
[52] U.S. Cl. ........................................... 303/190; 303/192
[58] Field of Search ................................. 303/9.67, 9.68, 303/190, 192, 165; 701/81

[56] References Cited

U.S. PATENT DOCUMENTS

| | | | |
|---|---|---|---|
| 3,606,491 | 9/1971 | Walsh | 303/192 X |
| 4,850,656 | 7/1989 | Ise et al. | 303/192 |
| 5,423,601 | 6/1995 | Sigl et al. | 303/192 X |

FOREIGN PATENT DOCUMENTS

A-6-503525  4/1994  Japan .

*Primary Examiner*—Lee W. Young
*Attorney, Agent, or Firm*—Oliff & Berridge, PLC

[57] ABSTRACT

An antilock brake system (ABS) control apparatus for a four-wheel drive vehicle, having a slope identifier for determining the drive status of the vehicle along a slope before an ABS control is started, and a controller that changes the usual ABS control to a control in which the ABS control is restricted on condition that the state of the drive along the slope has been decided, whereby the braking distance of the vehicle during the drive along the slope can be shortened.

1 Claim, 14 Drawing Sheets

FIG.8

| CONDITIONS VA | | "L4" SIGNAL ON | | "L4" SIGNAL OFF | |
|---|---|---|---|---|---|
| | | BEFORE CONTROL | UNDER CONTROL | BEFORE CONTROL | UNDER CONTROL |
| Fr WHEELS | AT START OF CONTROL km/h Vso<A | a km/h | b km/h | c km/h | d km/h |
| | AT START OF CONTROL km/h Vso≧A | c km/h | d km/h | c km/h | d km/h |
| Rr WHEELS | AT START OF CONTROL km/h Vso<A | a km/h | b km/h | c km/h | d km/h |
| | AT START OF CONTROL km/h Vso≧A | c km/h | d km/h | c km/h | d km/h |

FIG.13

| DRIVE SITUATION / METHOD OF DECIDING STEEP SLOPE | FIRST METHOD | SECOND METHOD | THIRD METHOD |
|---|---|---|---|
| A) STOP ON STEEP SLOPE→ACCELERATION→BRAKING ON STEEP SLOPE<br>A STOP SWITCH (STPSw) IS HELD OFF DURING THE ACCELERATION | ○ | ○ | △ |
| B) STOP ON STEEP SLOPE→ACCELERATION→BRAKING ON STEEP SLOPE<br>AN ACCELERATOR PEDAL IS SOMEWHAT STEPPED ON DURING THE ACCELERATION (WITH STPSw HELD ON) | ○ | — | △ |
| C) STOP OR DRIVE ON FLAT ROAD→BRAKING ON FLAT ROAD→CONTINUATION OF BRAKING EVEN ON STEEP SLOPE | — | — | ○ |
| D) DRIVE ON STEEP SLOPE→BRAKING ON STEEP SLOPE→CONTINUATION OF BRAKING EVEN ON FLAT ROAD | — | ○ | △ |
| E) STOP OR DRIVE ON FLAT ROAD→DRIVE ON STEEP SLOPE→BRAKING ON STEEP SLOPE | — | ○ | △ |

ANTILOCK BRAKE SYSTEM CONTROL APPARATUS

BACKGROUND OF THE INVENTION

1. Field of the Invention

The present invention relates to an control apparatus for an antilock brake system (ABS). More particularly, it relates to an ABS control apparatus wherein a braking hydraulic pressure is controlled to an appropriate value in accordance with the detection of the wheel slip of a four-wheel drive vehicle.

2. Description of the Prior Art

Heretofore, engine braking and pumping braking have been utilized in the descent of a motor vehicle along a steep slope. Herein, when the speed of the motor vehicle has somewhat risen into a region permitting an antilock brake system (ABS) control operation, the drive thereof enters an ABS control. Therefore, the stopping distance of the motor vehicle sometimes lengthens more than in the case of locking wheels. This is a phenomenon similar to the fact that, when the motor vehicle is to stop on a gravel road or the like, the stopping distance becomes shorter under the case of locking the wheels than under the ABS control operation, owing to the subsidence of the wheels into gravel.

In this regard, as techniques for preventing such an excessively sensitive control in the descent of the motor vehicle along the slope under the ABS control, by way of example, the official gazette of Japanese Patent Application Laid-open No. 503525/1994 discloses an antilock brake system (ABS) control apparatus wherein the sensitivity of the ABS control is altered upon the detection of a braking state during the descent along the slope.

The control apparatus disclosed in the aforementioned official gazette, however, has the problem that the control sensitivity cannot be altered unless the ABS control is once started, so the braking distance of the motor vehicle becomes longer owing to delay of the alteration of the control sensitivity.

SUMMARY OF THE INVENTION

The present invention has been made in order to solve the problem of the prior art as stated above, and has for its object to provide an antilock brake system (ABS) control apparatus which can shorten the braking distance of a four-wheel drive vehicle during the drive thereof on a slope.

The present invention with its gist illustrated in FIG. 1 has achieved the above object by adopting a structure for an antilock brake system control apparatus wherein a braking hydraulic pressure is controlled to an appropriate value in accordance with detection of a wheel slip of a four-wheel drive vehicle, comprising slope decision means for deciding a state of drive of the vehicle on a slope before start of a brake operation, and control changeover means for changing the usual antilock brake system control to a specified one in which the antilock brake system control is restricted more than usual, on condition that the state of the drive on the slope has been decided by said slope decision means.

More specifically, the drive of a four-wheel drive vehicle on a slope is detected before the start of an ABS control. When the drive on the slope has been detected, it is made difficult to enter the ABS control in, for example, such a way that the speeds of the motor vehicle at which the ABS control is started and ended are altered to be higher than usual. Thus, the stopping distance of the motor vehicle can be prevented from lengthening.

Moreover, even when the drive has entered the ABS control, the sensitivity of this control can be set somewhat lower from the beginning thereof. Therefore, not only the stopping distance of the motor vehicle can be shortened, but also the stopping behavior or stability thereof can be kept good (because a braking force does not suddenly change midway).

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 8 is a table showing a method of setting a control starting/ending reference speed;

FIG. 13 is a table showing the effects of the first–third methods of deciding a steep slope.

DETAILED DESCRIPTION OF THE PREFERRED EMBODIMENTS

Figure 1:
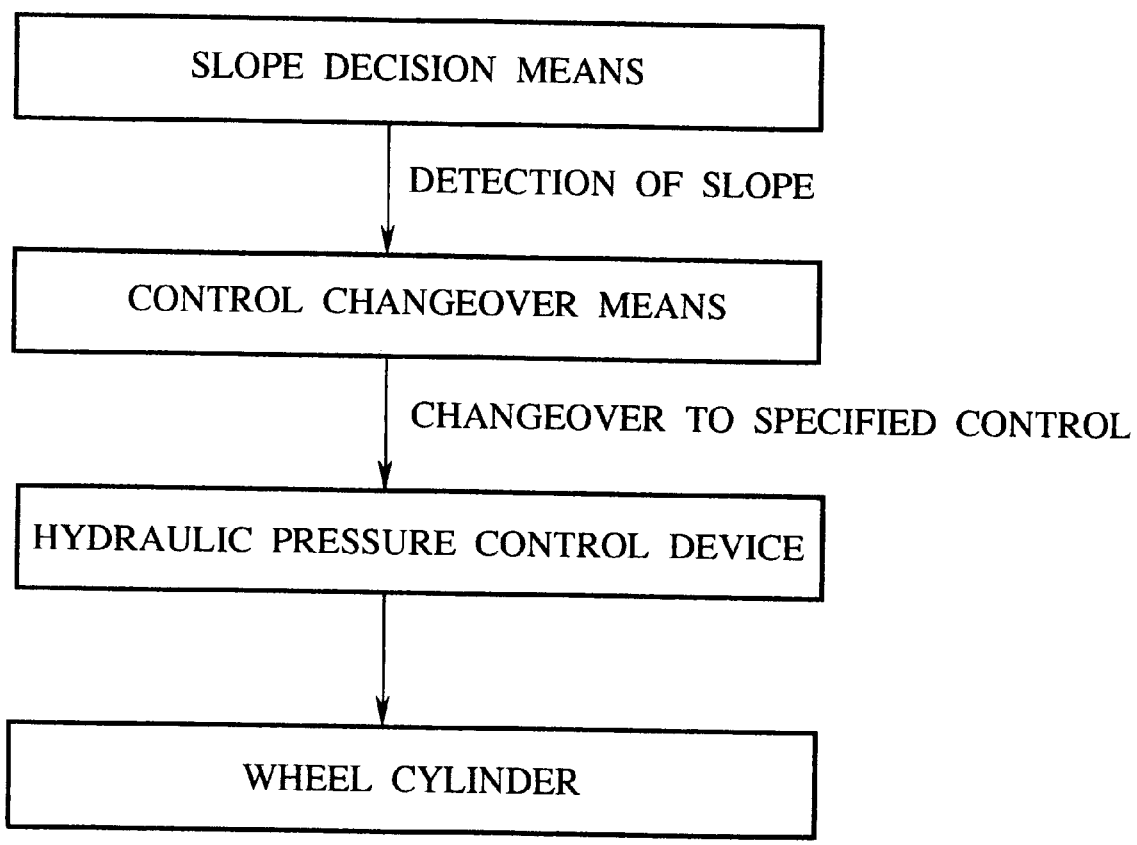
FIG. 1 is a conceptual summary diagram showing the gist of the construction of the present invention.
Figure 2:
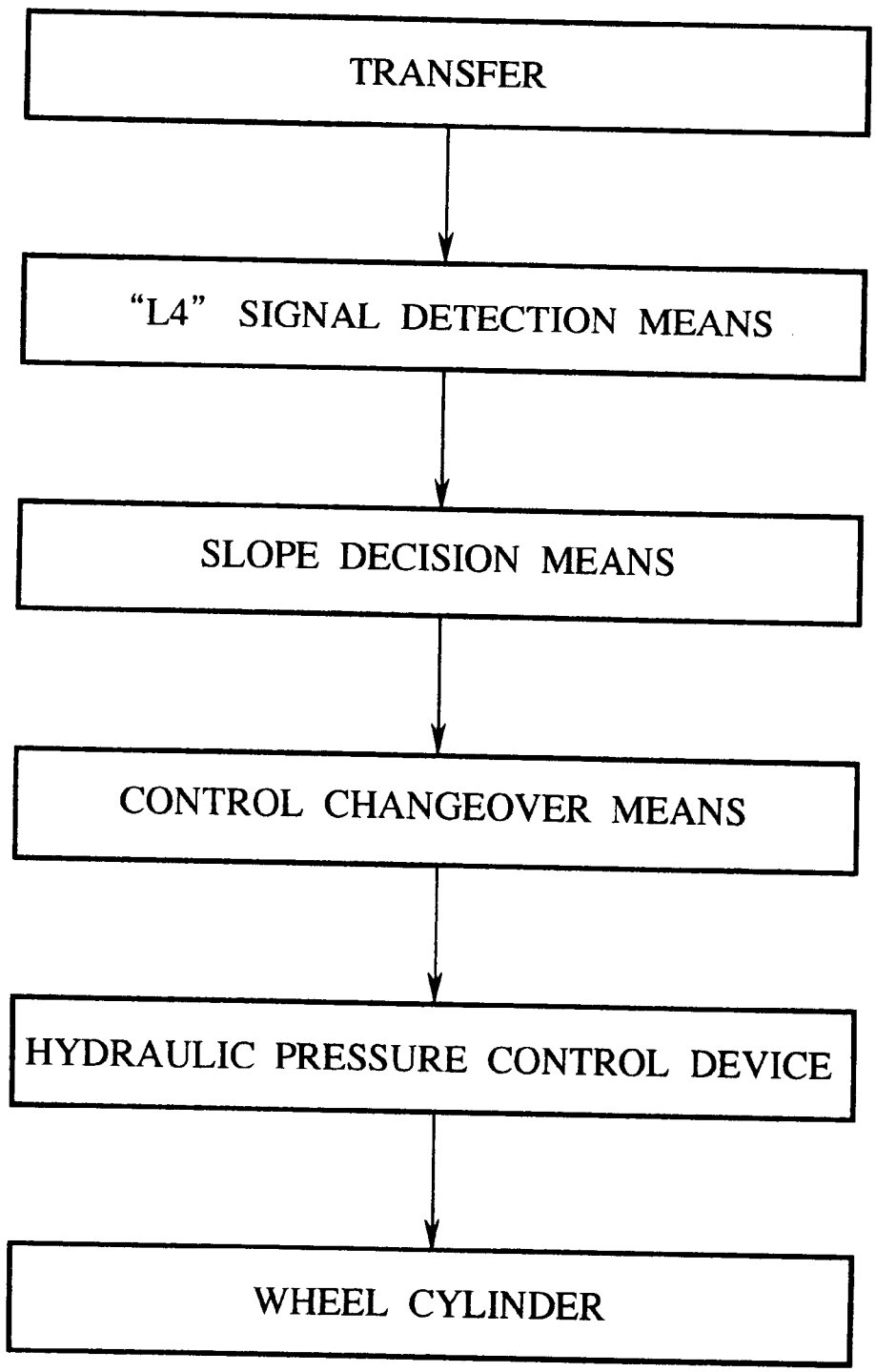
FIG. 2 is a conceptual diagram showing the gist of a first embodiment of the present invention.

As outlined in FIG. 2, a preferable aspect of performance ($1^{st}$ embodiment) is that the slope decision (or detecting) means (shown in FIG. 1) is adapted to decide the drive of a four-wheel drive vehicle on or along a slope on the basis of the turn-ON signal of "L4" drive. Thus, the optimal specified control conforming to the "L4" drive can be carried out from the beginning of the start of the braking control, so that the braking distance of the motor vehicle can be shortened.

By the way, the turn-ON signal of the "L4" drive signifies a signal which is generated when both "four-wheel drive" and "low side gear train" are selected, in a case where an automatic transmission permits the selection of either of the low side gear train and a high side gear train, and where the motor vehicle permits the selection of either of two-wheel drive and the four-wheel drive.

Figure 3:
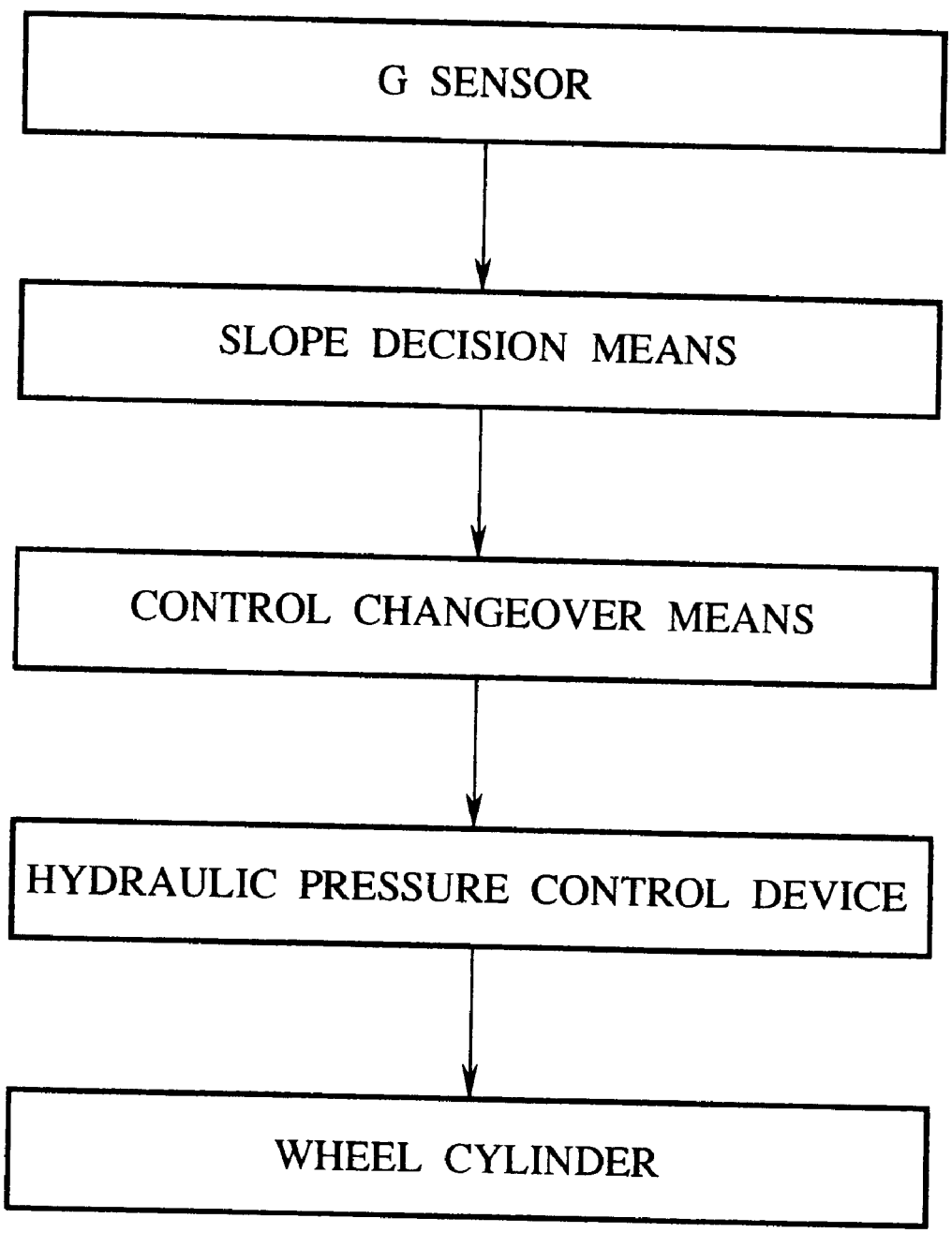
FIG. 3 is a conceptual diagram showing the gist of a second embodiment of the present invention.

As outlined in FIG. 3, another preferable aspect of performance ($2^d$ embodiment) is that the slope decision (detecting) means is adapted to decide the drive of the four-wheel drive vehicle on or along a slope on the basis of the signal of a G sensor (acceleration sensor) of pendulum type. Thus, the optimal specified control can be carried out from the beginning of the start of the braking control as regards only the drive on the slope, so that the braking distance can be shortened.

Now, concrete examples of the aspects of performance (embodiments) of the present invention will be described in detail with reference to the drawings.

Figure 4:
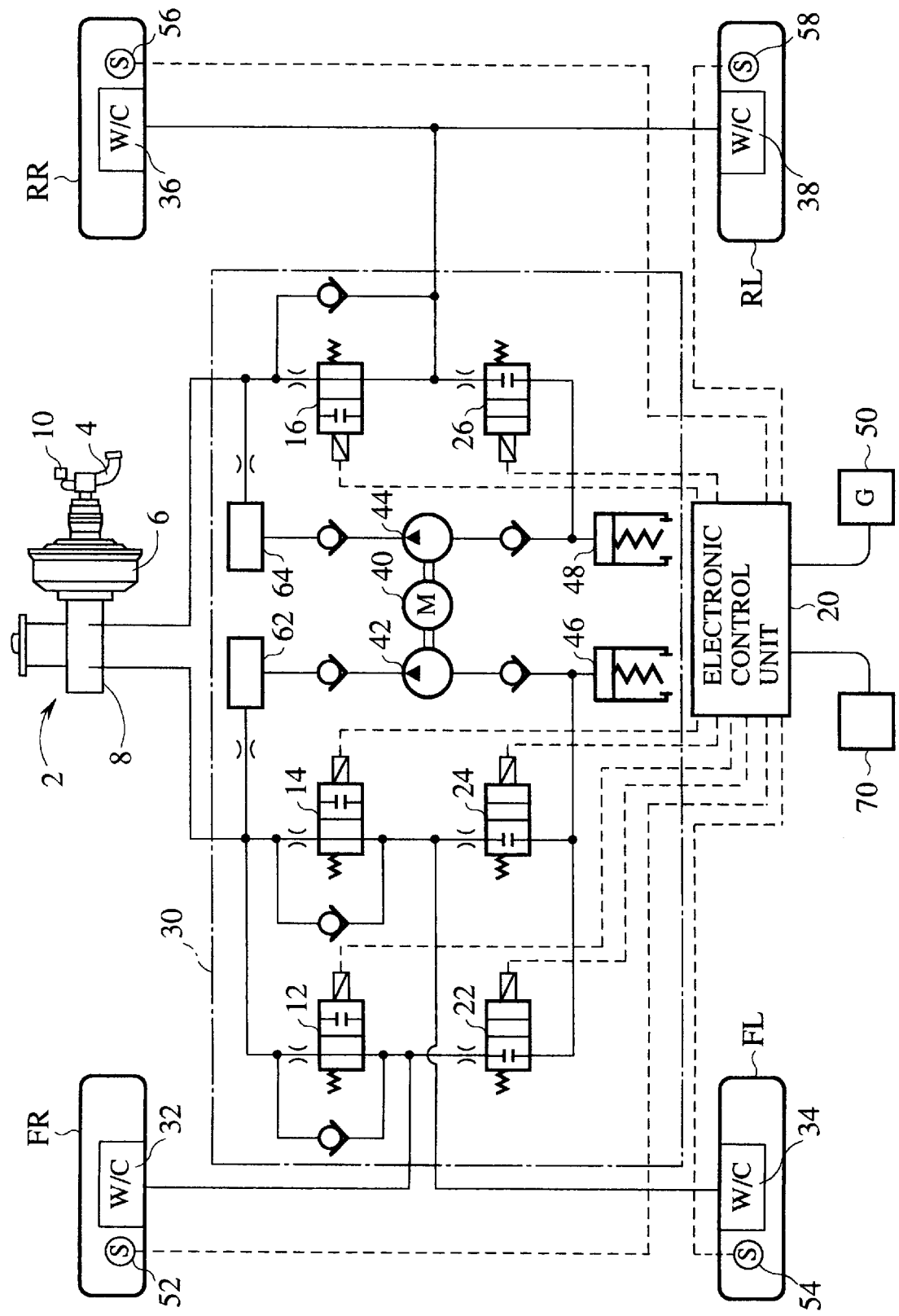
FIG. 4 is a connection diagram showing the hydraulic circuit of an antilock brake system (ABS) control apparatus in an aspect of performance (embodiment) of the present invention.
Figure 5:
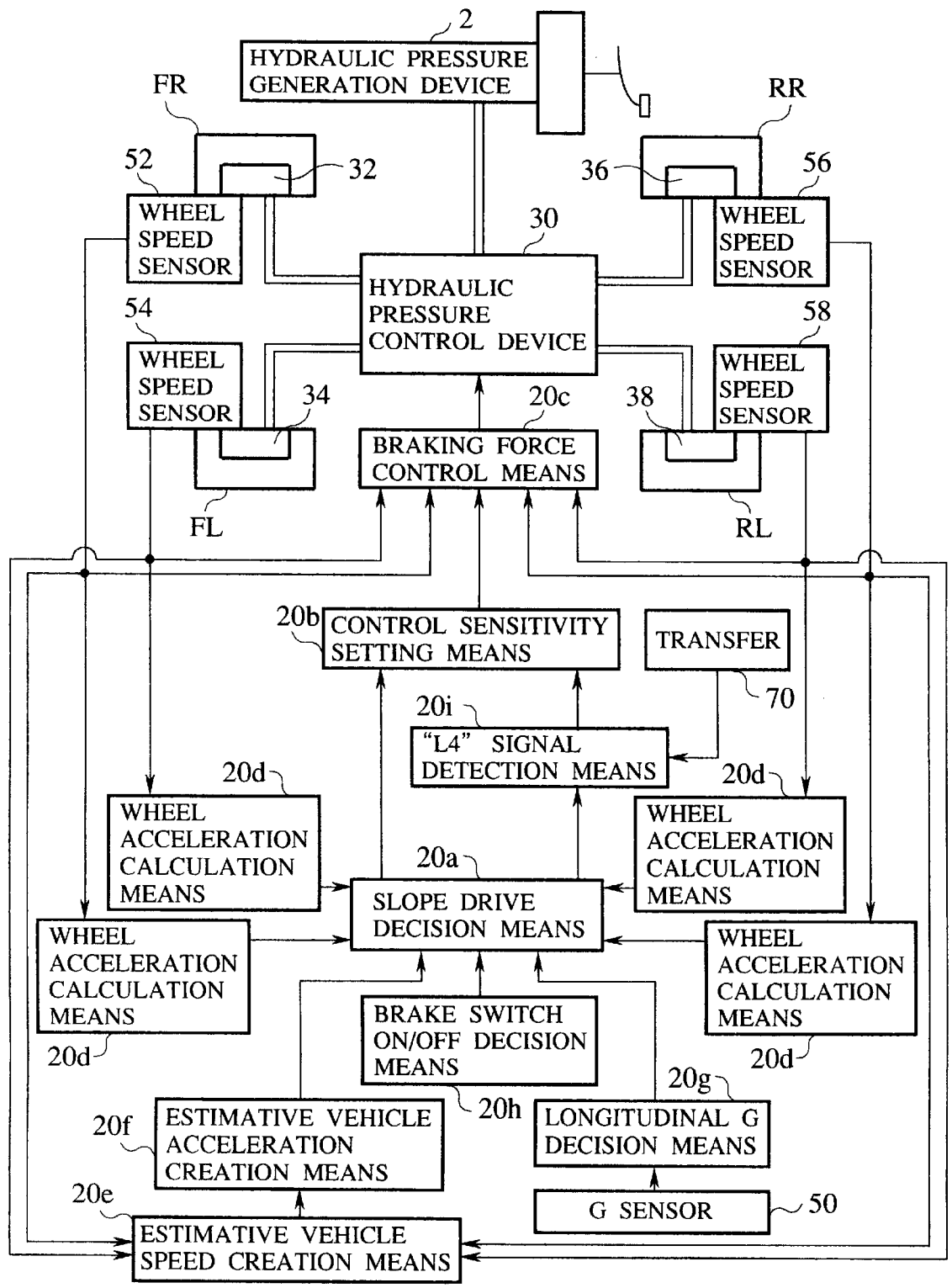
FIG. 5 is a block diagram showing the electric signal system of the antilock brake system (ABS) control apparatus in the aspect of performance of the present invention.

FIG. 4 is a connection diagram of a hydraulic circuit schematically showing an antilock brake system (ABS) control apparatus for a four-wheel drive vehicle according to the present invention, while FIG. 5 is a block diagram showing an electric signal circuit included in the control apparatus.

Referring to FIG. 4, a hydraulic pressure generation device 2 includes a brake pedal 4, a booster 6, a master cylinder 8, etc. When the brake pedal 4 is stepped on, the resulting tread force is amplified by the booster 6, and a hydraulic pressure is generated in the master cylinder 8. In addition, the tread on the brake pedal 4 is detected by a brake switch 10, and the resulting detection signal is sent to an electronic control unit 20.

The hydraulic pressure generated in the master cylinder 8 is transmitted to the wheel cylinder 32 of the front right wheel FR of the motor vehicle through a pressure increasing solenoid valve 12, and to the wheel cylinder 34 of the front left wheel FL through a pressure increasing solenoid valve 14. Further, it is transmitted to the wheel cylinder 36 of the rear right wheel RR of the motor vehicle and the wheel cylinder 38 of the rear left wheel RL through a pressure increasing solenoid valve 16.

Under the ABS control of the motor vehicle, a pressure increasing operation proceeds in such a way that pumps 42 and 44 are driven by a motor 40, and oil is drawn up from reservoirs 46 and 48 respectively corresponding to the pumps 42 and 44 and is fed to the. wheel cylinders 32, 34 and 36, 38 through the pressure increasing solenoid valves 12, 14 and 16 respectively associated therewith, whereby the braking hydraulic pressures of the wheels are increased. On the other hand, a pressure decreasing operation proceeds in such a way that the pressure increasing solenoid valves 12, 14 and 16 are closed, whereas pressure decreasing solenoid valves 22, 24 and 26 are opened, and that the oil is returned to the reservoirs 46 and 48 from the wheel cylinders 32, 34 and 36, 38 respectively associated with the solenoid valves 22, 24 and 26, whereby the braking hydraulic pressures of the wheels are decreased.

A portion which controls the hydraulic pressures of the wheel cylinders 32, 34, 36 and 38 as stated above and which is indicated by enclosure with a dot-and-dash line in FIG. 4, corresponds to a hydraulic pressure control device 30 (refer also to FIGS. 1, 2 and 3).

Besides, numerals 62 and 64 designate dumpers. The wheel speeds of the wheels FR, FL, RR and RL are respectively detected by wheel speed sensors 52, 54, 56 and 58.

Incidentally, the electronic control unit 20 decides whether the motor vehicle is driving on a slope upon receiving the signal indicative of the proceeding of the "L4" drive from a transfer 70, or upon detecting the signal of the longitudinal acceleration G of the car body of the motor vehicle by means of the G sensor 50. Subject to the decision of the drive on the slope, the electronic control unit 20 commands the hydraulic pressure control device 30 to execute the specified control in which the ABS control is restricted more than usual.

FIG. 5 illustrates the flows of control signals for realizing the control explained above.

Referring to the figure, constituents which are denoted by numerals 20 bearing the suffixes of small alphabetic letters are all the functions of the electronic control unit 20. More specifically, the electronic control unit 20 includes: "L4" signal detection means 20$i$ for detecting the proceeding of the "L4" drive upon receiving the "L4" signal from the transfer 70; wheel acceleration calculation means 20$d$ for calculating wheel accelerations DVW's from the wheel speeds VW's obtained by the wheel speed sensors 52, 54, 56 and 58, respectively; estimative vehicle speed creation means 20$e$ for creating an estimative vehicle speed VSO from the same wheel speeds VW's as mentioned above; estimative vehicle acceleration creation means 20$f$ for creating an estimative vehicle acceleration DVSO; longitudinal G decision means 20$g$ for detecting the longitudinal acceleration G from the signal of the G sensor 50; and brake switch ON/OFF decision means 20$h$ for deciding the ON or OFF state of the brake switch 10. Also included are: slope drive decision means 20$a$ for detecting the drive on a slope on the basis of some of the above signals; control sensitivity setting means 20$b$ for altering the vehicle speed VA at which the drive of the motor vehicle starts/ends the ABS control, on condition that the proceeding of the drive on the slope has been detected on the basis of the turn-ON signal of the "L4" drive or/and the signal of the G sensor 50; and braking force control means 20$c$ for controlling the hydraulic pressure control device 30.

The aspects of performance embodiments of the present invention are classified into one in which the "L4" signal from the transfer 70 is used for deciding the state of the drive on the slope as a condition for starting the specified control, and the other in which the signal of the G sensor 50 is used. They shall be respectively defined as the first aspect of performance ($1^{st}$ embodiment) and the second aspect of performance ($2^d$ embodiments), the operations of which will be detailed in conjunction with flow charts discussed below.

Now, the first aspect of performance utilizing the "L4" signal of the transfer 70 will be described.

Figure 6:
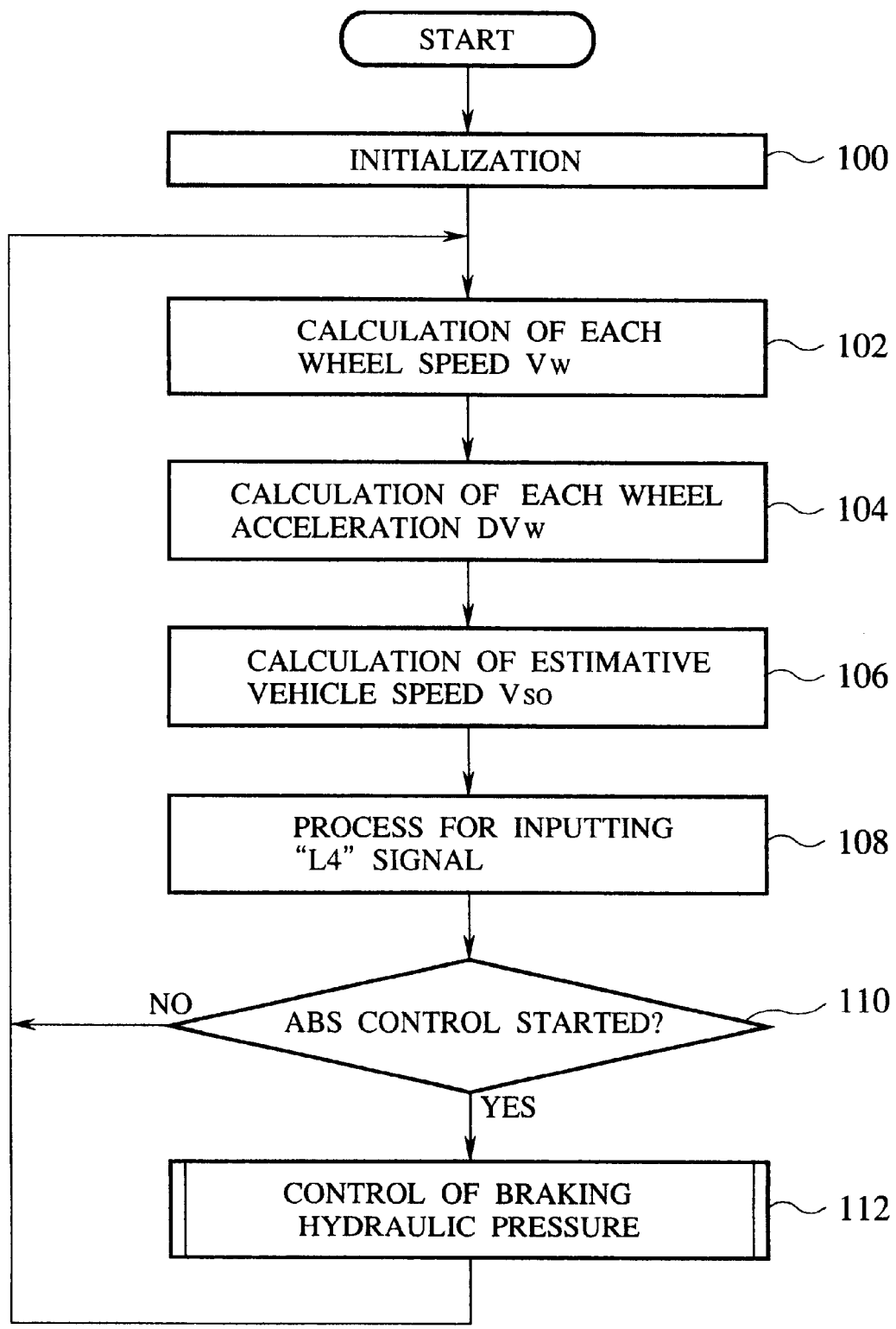
FIG. 6 is a main flow chart showing the control of the first aspect of performance of the present invention.
Figure 7:
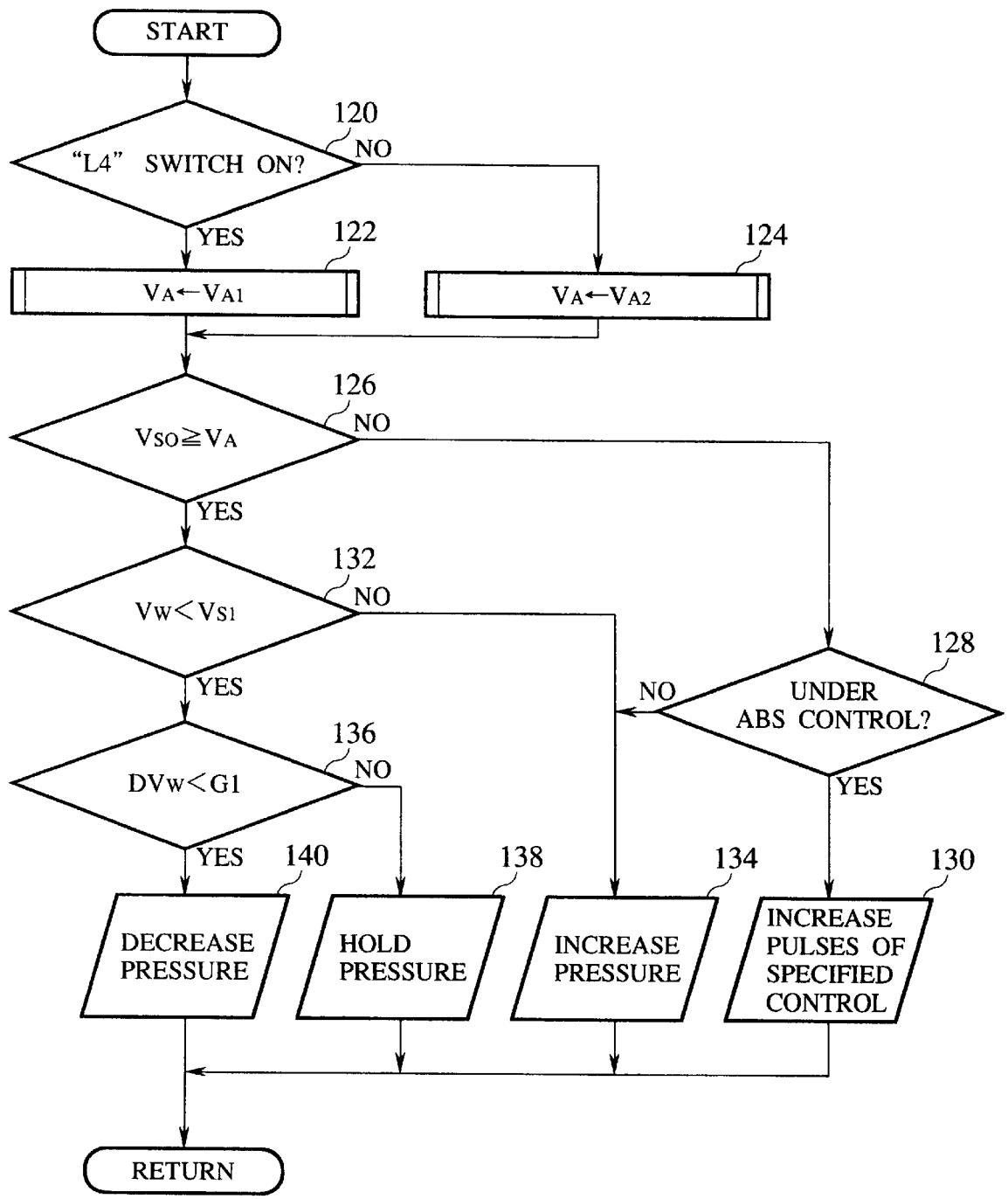
FIG. 7 is a detailed flow chart of a braking hydraulic pressure control in the first aspect of performance.

FIG. 6 is the main flow chart of the overall control according to this aspect of performance ($1^{st}$ embodiment), while FIG. 7 is the detailed flow chart of a braking hydraulic pressure control contained in the overall control.

At a step 100 in FIG. 6, various parameters etc. for use in the overall control are initialized. At steps 102 thru 108 succeeding the step 100, the wheel speeds VW's, wheel accelerations DVW's and estimative vehicle speed VSO are calculated on the basis of the signals delivered from the wheel speed sensors 52, 54, 56 and 58, and an "L4" signal input process is executed in accordance with a signal delivered from the transfer 70.

The next step 110 functions to judge whether or not the ABS control has been started. If the ABS control has been started, the braking hydraulic pressure is controlled at the subsequent step 112, and if not, the control flow is returned to the step 102.

The detailed flow chart of the braking hydraulic pressure control is illustrated in FIG. 7.

At a step 120 in FIG. 7, whether or not the "L4" signal has turned ON is judged. At steps 122 and 124 succeeding the step 120, values VA1 and VA2 corresponding to the ON and OFF states of the "L4" signal are set as a control starting/ending reference speed VA, respectively.

The values of the control starting/ending reference speed VA corresponding respectively to the turn-ON and -OFF of the "L4" signal are changed in conformity to a table illustrated in FIG. 8.

Referring to the table, the specified control shall be performed during the "L4" drive only. Besides, the control starting/ending reference speed VA shall be changed (or set) depending upon whether or not the estimative vehicle speed VSO is greater than or equal to a value A [km/h] (for example, 30 [km/h] or so). The value A is a threshold value which is assumed as the upper limit of the vehicle speed at which the general drivers of motor vehicles are allowed to drive on a steep slope. More specifically, in a case where the ABS control is to be started at the vehicle speed A [km/h] or above, it is decided even during the "L4" drive that the motor vehicle is not driving on the steep slope, and the usual mode of the ABS control is restored. In contrast, in a case where the ABS control is to be started at a vehicle speed below A [km/h], the control starting/ending reference speed VA is changed-over as indicated in the table of FIG. 8, namely, c→a for starting ABS control, d→b for ending.

In addition, the same control starting/ending reference speed VA is set for both the front wheels Fr and the rear wheels Rr in order that the vehicle may be prevented from becoming unstable due to the preceding lock of the rear wheels Rr in the reverse movement thereof on a slope.

In each of the ON and OFF states of the "L4" signal, the control starting/ending reference speed VA is changed (or set) depending upon whether the drive of the motor vehicle is before or under the ABS control. More specifically, a column "Before Control" expresses the vehicle speed at which the ABS control can be started, while a column "Under Control" expresses the vehicle speed at which the ABS control is ended. Incidentally, letters A, a, b, c and d denote constants, which can be altered at will. However, inequalities a>c, a>b, b>d and c>d must be held in this aspect of performance.

Referring back to FIG. 7, the control starting/ending reference speed VA has been set as explained above. Thereafter, in a case where the estimative vehicle speed VSO has been judged less than the control starting/ending reference speed VA at a step 126, and where the proceeding of the ABS control has been judged at a step 128, an increasing pulses for the specified control is outputted at the next step 130 so as to forcibly increase the hydraulic pressure.

In case of the judgement of the step 126 that the estimative vehicle speed VSO is greater than or equal to the control starting/ending reference speed VA, the usual mode of the ABS control is performed. First, the wheel speed VW and a control reference speed VS1 are compared at a step 132. When the wheel speed VW is greater than or equal to the control reference speed VS1 here, or when the proceeding of the ABS control has not been judged at the step 128, the control flow advances to a step 134, at which an output for increasing the hydraulic pressure is delivered.

In a case where the wheel speed VW is less than the control reference speed VS1 at the step 132, the wheel acceleration DVW is compared with a control reference acceleration G1 at the next step 136. When the wheel acceleration DVW is greater than or equal to the control reference acceleration, an output for G1 holding, or maintaining the hydraulic pressure is delivered at a step 138. In contrast, on condition that the wheel acceleration DVW is less than the control reference acceleration G1, an output for decreasing the hydraulic pressure is delivered at a step 140.

It has been stated above that the control starting/ending reference speed VA is changed-over in accordance with the turn-ON or -OFF of the "L4" signal in the braking hydraulic pressure control. In this regard, a control starting sensitivity, such as a vehicle speed Vsh indicative of the timing at which the hydraulic pressure is decreased before the ABS control, or a vehicle speed Vsn indicative of the timing at which the hydraulic pressure is decreased under the ABS control, may well be similarly set in accordance with the turn-ON or -OFF of the "L4" signal. That is in the case where the "L4" signal is ON, the value of the sensitivity is set greater so as to render starting the ABS control more difficult.

Here, the control starting sensitivities Vsh and Vsn are constants, which can be altered at will. Incidentally, the guard of the performance of the ABS control based on the estimative vehicle speed VSO, the guard serving to end the specified control (specified mode) and to restore the usual control (usual mode) on condition that the estimative vehicle speed VSO is greater than or equal to the predetermined value A, can be similarly set in the case of utilizing the control starting sensitivity or sensitivities.

As described above, according to this aspect of performance, the control apparatus is constructed so as to decide the state of the drive along the slope on the basis of the "L4" drive signal. Therefore, the optimal specified control conforming to the "L4" drive can be carried out from the beginning of the start of the braking control, and the braking distance can be shortened.

Next, the second aspect of performance ($2^d$ embodiment) which uses the signal of the G sensor 50 will be described.

Figure 9:
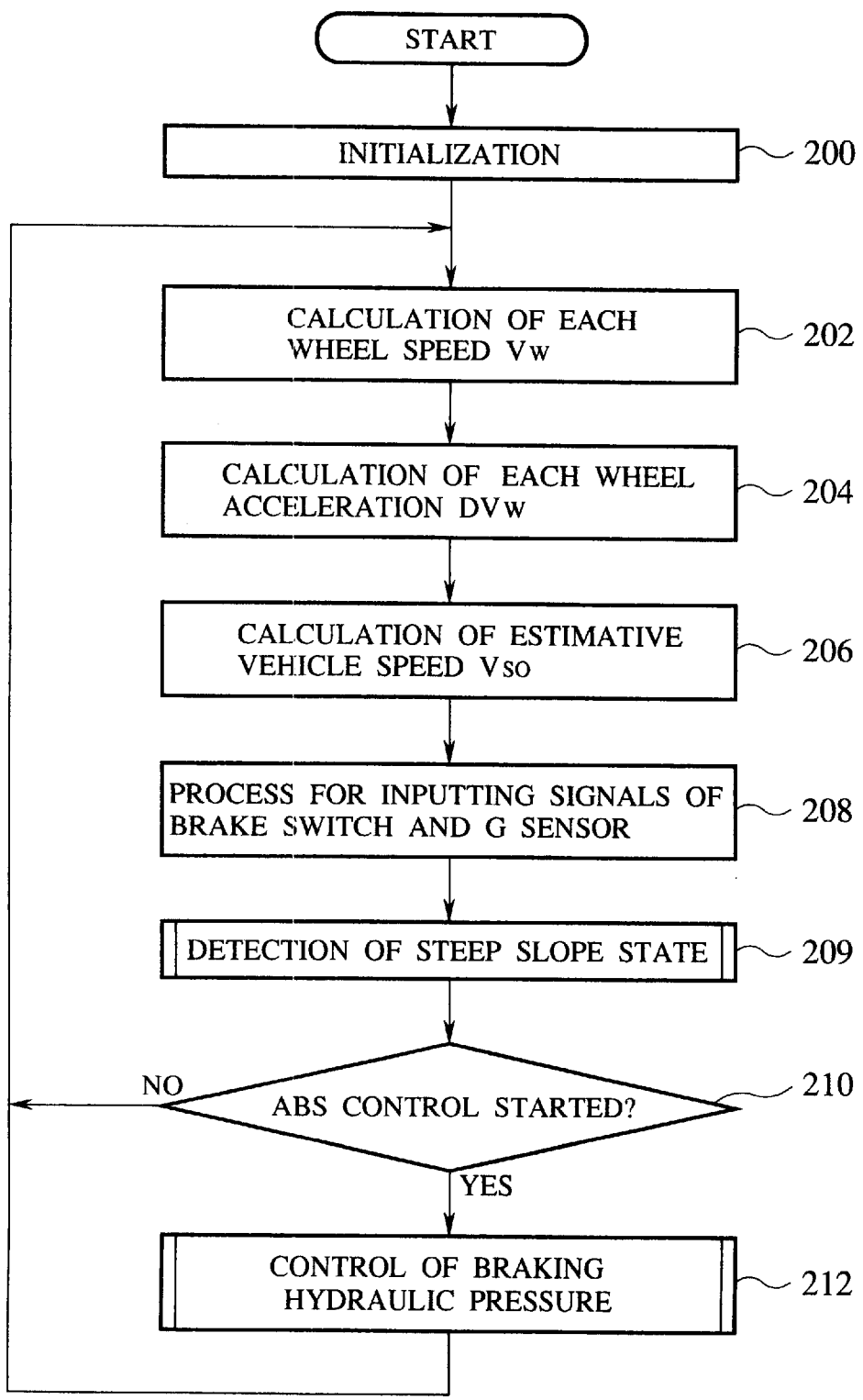
FIG. 9 is a main flow chart showing the control of the second aspect of performance of the present invention.
Figure 10:
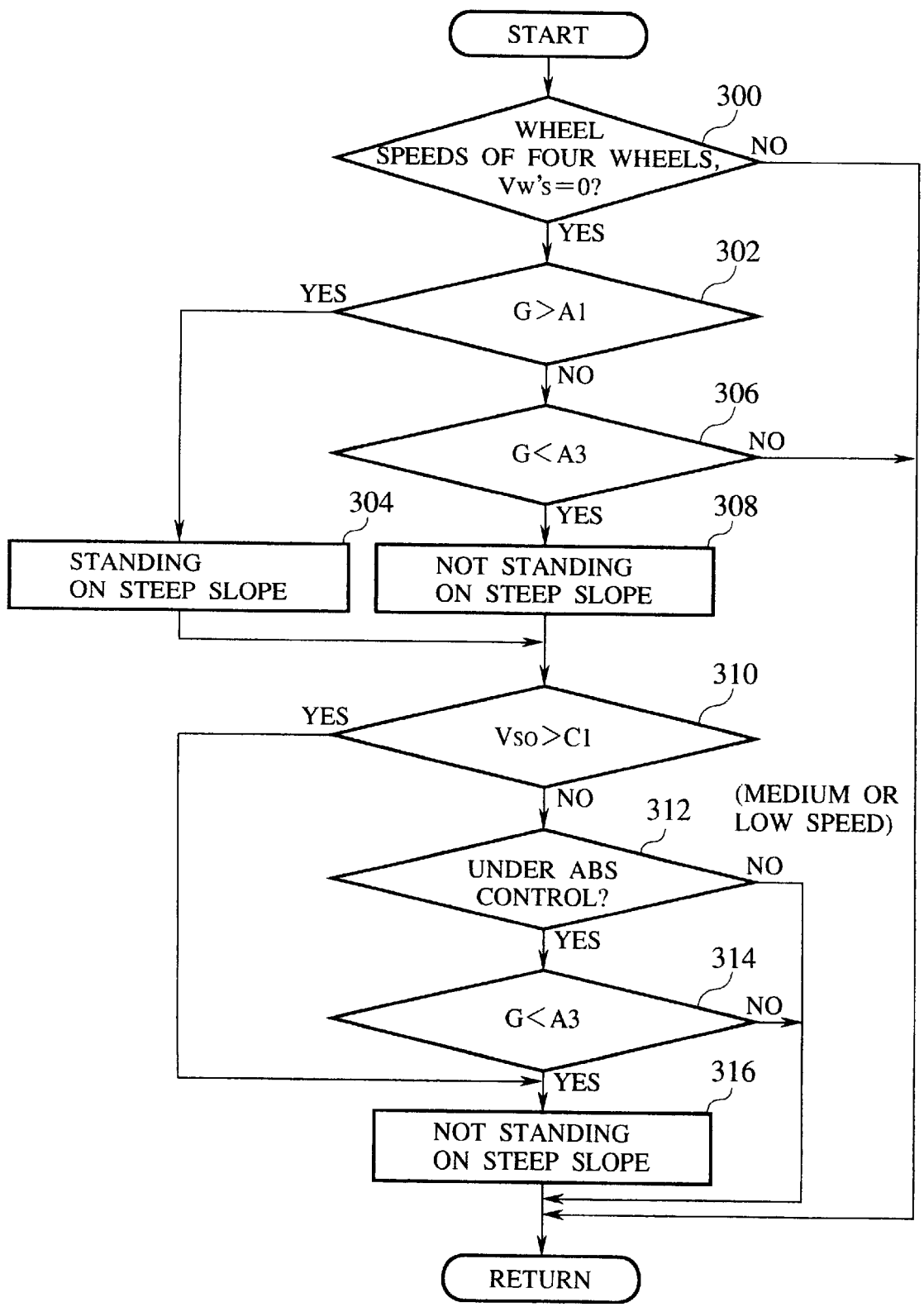
FIG. 10 is a flow chart showing the first method of deciding a steep slope in the second aspect of performance.

FIG. 9 is the main flow chart of the overall control according to this aspect of performance ($2^d$ embodiment), while FIG. 10 is the detailed flow chart of a braking hydraulic pressure control contained in the overall control.

At a step 200 in FIG. 9, various parameters etc. for use in the overall control are initialized. At steps 202 thru 206 succeeding the step 200, the wheel speeds VW's, wheel accelerations DVW's and estimative vehicle speed VSO are calculated on the basis of the signals delivered from the wheel speed sensors 52, 54, 56 and 58. The control flow of the second aspect of performance ($2^d$ embodiment) thus far explained is the same as that of the first aspect of performance (1st embodiment).

At the next step 208, the signals from the brake switch 10 and G sensor 50 are inputted. At a step 209, the steep slope state of the four-wheel drive vehicle is detected (or decided) using the signal of the G sensor 50. At a step 210, it is judged whether or not the ABS control has been started. If the ABS control has not been started yet, the control flow is returned to the step 202. On the other hand, if the ABS control has been started, the braking hydraulic pressure is controlled at the subsequent step 212, which is followed by the step 202.

The process for detecting the steep slope state will be explained below.

In general, a four-wheel drive vehicle employs a G sensor within an ABS control apparatus in order to detect the longitudinal vehicle deceleration thereof, irrespective of whether or not the "L4" drive is possible. The pendulum type is representative as the G sensor. A G sensor of this type is swung on a steep slope by the gravitational acceleration even while the motor vehicle is not braked. Owing to this feature, therefore, three sorts of steep slope detection logic are considered as elucidated below, that is, "Detection of Standing on Steep slope", "Detection of Driving on Steep slope" and "Detection of Braking on Steep slope".

Initially, there will be explained a method of detecting "Standing on Steep slope" as the first detection.

With this method, the state in which the motor vehicle is standing on the steep slope is decided when the following conditions are met:

(1-1) The wheel speeds of all the four wheels are zero (VW's=0); and (1-2) the longitudinal acceleration G of the car body of the motor vehicle is greater than a predetermined value A1 which is a threshold value based on the G sensor signal (G>A1).

On the other hand, a cancellation condition in this case (under which the decision of the standing on the steep slope is canceled) is that any of the following conditions is met:

(1-3) The wheel speeds of all the four wheels are zero (VW's=0), and the longitudinal acceleration G is less than a predetermined value A3 (G<A3); or (1-4) the estimative vehicle speed VSO is greater than a predetermined value C1 (VSO>C1); or (1-5) the ABS control is proceeding, and the longitudinal acceleration G is less than the predetermined value A3 (G<A3).

Herein, the reason for the decision of the standing on the steep slope is that, while the motor vehicle is standing on a flat road, the G sensor 50 does not swing as long as it is normal, and that, if the G sensor 50 is swinging to the extent of exceeding the threshold value (A1), there will be a high possibility of standing on the steep slope. On the other hand, the condition (1-4) for canceling the decision of the standing on the steep slope is based on the intention that, if the estimative vehicle speed VSO exceeds the predetermined value C1, the state of the motor vehicle shall not be regarded as standing on the steep slope, so the specified control shall not be effectuated. Further, the cancellation condition (1-3) or (1-5) is set for the reason that, if the motor vehicle is on the steep slope, the magnitude of the longitudinal acceleration G is enlarged by a braking force and the gravitational acceleration due to the steep slope, and that, if the longitudinal acceleration G becomes small, there will be a high possibility of not standing on the steep slope.

The first detecting method will now be explained in conjunction with the flow chart of FIG. 10.

At a step 300, whether or not the wheel speeds VW's of all the four wheels are zero is judged. In a case where the wheel speeds VW's of all the four wheels are zero, whether or not the longitudinal acceleration G is greater than the predetermined value A1 is judged at a step 302 succeeding the step 300. In a case where, as a result, the two conditions have been found fulfilled, the state of the motor vehicle standing on the steep slope is decided at a step 304.

Besides, in a case where the wheel speed VW of any of the four wheels is not zero, the control flow of this method is returned. In a case where the longitudinal acceleration G is not greater than the predetermined value A1, the step 302 is followed by a step 306.

At the step 306, whether or not the longitudinal acceleration G is less than the predetermined value A3 is judged. When the acceleration G is less, it is decided at the next step 308 that the motor vehicle is not standing on the steep slope, and when not, the control flow is returned.

A step 310 succeeding the step 304 or 308 functions to judge whether or not the estimative vehicle speed VSO is greater than the predetermined value C1. If the estimative vehicle speed VSO is greater than the predetermined value C1, the control flow advances to a step 316, in which it is decided that the motor vehicle is not standing on the steep slope. On the other hand, if the speed VSO is not greater than the value C1, steps 312 and 314 check the condition that the ABS control is proceeding and that the longitudinal acceleration G is less than the predetermined value A3. When the conditions are fulfilled, it is decided at the next step 316 that the motor vehicle is not standing on the steep slope. In contrast, when the condition is not fulfilled, the control flow is returned. The standing of the motor vehicle on the steep slope is decided as stated above.

Next, there will be explained a method of detecting "Driving on Steep slope" as the second detection.

This detection consists in that the state in which the motor vehicle is driving on the steep slope is decided when the following conditions are met:

(2-1) The brake switch is OFF; and (2-2) the difference between the estimative vehicle acceleration DVSO and the longitudinal acceleration G is greater than a predetermined value A2 (DVSO−G>A2); and (2-3) the above two conditions have continued for a predetermined time period (C2) or longer.

In addition, cancellation conditions in this case are as follows:

(2-4) The brake switch is OFF; and (2-5) the difference between the estimative vehicle acceleration DVSO and the longitudinal acceleration G is less than a predetermined value A4 (DVSO−G<A4); and (2-6) the above two conditions have continued for a predetermined time period (C3) or longer. Here, the constants A2, A4, C2 and C4 can be set at will as long as an equality A2>A4 is held.

The reason for this aspect is that the estimative vehicle acceleration DVSO is thought to become greater than the longitudinal acceleration G during the drive of the motor vehicle on the steep slope, whereas these accelerations DVSO and G are thought to become substantially equal during the drive on the flat road.

An alternative cancellation condition is as follows:

(2-7) The estimative vehicle speed VSO is greater than a predetermined value C1' (VSO>C1').

This aspect is based on the reason that, since the vehicle speed at which the general drivers of motor vehicles can drive is limited on a steep slope, if the estimative vehicle speed VSO exceeds the predetermined value C1' (for example, 30 [km/h]), the state of the motor vehicle shall not be regarded as driving on the steep slope, so the specified control shall not be effectuated.

Figure 11:
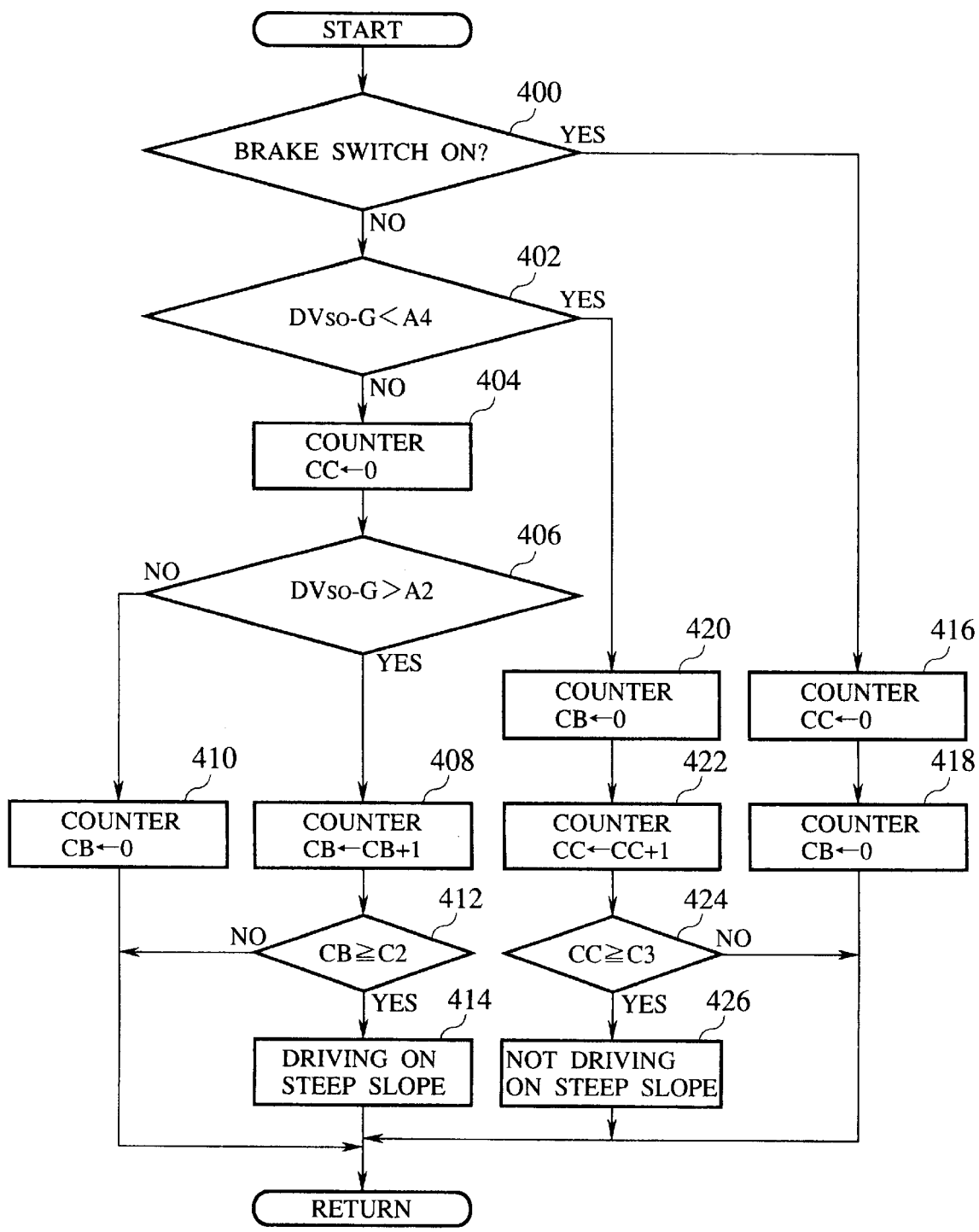
FIG. 11 is a flow chart showing the second method of deciding a steep slope in the second aspect of performance.

The second detecting method will now be explained in conjunction with a flow chart illustrated in FIG. 11.

At a step 400, whether or not the brake switch is ON is judged. In a case where the brake switch is OFF, the control flow of this method advances to the next step 402. When it has been decided at the step 402 that the difference between the estimative vehicle acceleration DVSO and the longitudinal acceleration G is not less than the predetermined value A4, a counter CC which keeps the time in order to judge whether or not the conditions (2-4) and (2-5) have held continuously for, at least, the predetermined time period C3, is cleared to zero at a step 404.

At a step 406, the difference between the estimative vehicle acceleration DVSO and the longitudinal acceleration G is compared with the predetermined value A2. In a case where, as a result, the difference has been found greater than the predetermined value A2, the content of a counter CB which keeps the time in order to judge whether or not the conditions (2-1) and (2-2) have held continuously for, at least, the predetermined time period C2, is counted up by one at the next step 408, followed by a step 412. On the other hand, in a case where the difference is not greater than the predetermined value A2, the counter CB is cleared to zero at a step 410, and the control flow is returned.

The step 412 functions to judge whether or not the content of the counter CB is, at least, the predetermined value C2. In a case where the content of the counter CB is, at least, the predetermined value C2, the state of the motor vehicle driving on the steep slope is decided at the next step 414, and in a case where the counter CB is less than the value C2, the control flow is directly returned.

Meanwhile, in a case where the brake switch is ON as the judgement of the step 400, the control flow advances to steps 416 and 418, at which both the counters CC and CB are cleared to zero. Thereafter, the control flow is returned.

Besides, when the difference between the estimative vehicle acceleration DVSO and the longitudinal acceleration G is less than the predetermined value A4 at the step 402, the counter CB is cleared to zero at a step 420, and the counter CC is counted up by one at a step 422. In a case where the content of the counter CC is greater than or equal to the predetermined value C3 as the judgement of the next step 424, it is decided that the motor vehicle is not driving on the steep slope at a step 426. Further, in a case where the counter CC is less than the predetermined value C3 at the step 424, the control flow is directly returned.

Lastly, there will be explained a method of detecting "Braking on Steep slope" as the third detection.

When the following conditions are all met, it is decided that the motor vehicle is being braked on the steep slope:

(3-1) Regarding the wheel acceleration DVW, inequalities $DVW(n-1) \geq DVW(n-2)$ and $DVW(n) < DVW(n-1)$ are held in excess of CB1 [times] within a time period CA1; and (3-2) the ABS control is proceeding (under the ABS control); and (3-3) the longitudinal acceleration G is greater than a predetermined value A2 (G>A2).

On the other hand, a cancellation condition in this case is that any of the following conditions is met:

(3-4) The above condition (3-1) is not held; or (3-5) the ABS control is not started yet (before the ABS control); or (3-6) the ABS control is proceeding, and the acceleration G is less than a predetermined value A3 (G<A3).

As in the foregoing, the constants CB1, CA1, A2 and A3 can be altered at will.

These conditions depend on the reasons that the changing cycles of the wheel acceleration DVW tend to quickening on account of, e. g., load shifts ascribable to the drive of the motor vehicle on a bad road or the braking thereof on a slope, and that the longitudinal acceleration G enlarges during the braking of the motor vehicle on the steep slope. On the contrary, if the longitudinal acceleration G is small, there will be a high possibility of not braking on the steep slope.

Figure 12:
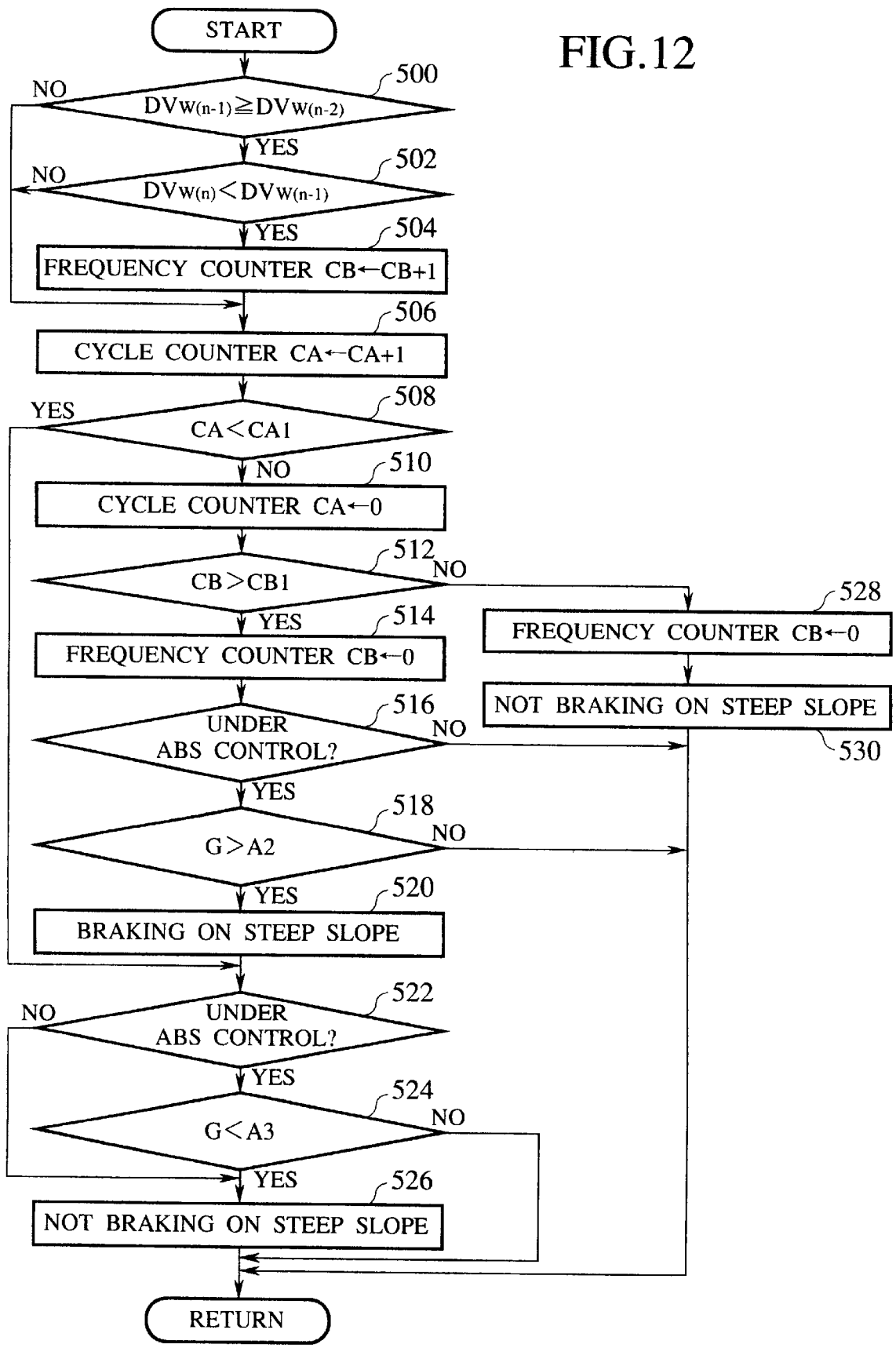
FIG. 12 is a flow chart showing the third method of deciding a steep slope in the second aspect of performance.

The third detecting method will now be explained in conjunction with a flow chart illustrated in FIG. 12.

Steps 500 and 502 function to judge whether or not the conditional inequalities DVW(n−1) DVW(n−2) and DVW (n)<DVW(n−1) concerning the wheel acceleration DVW are held, respectively. In a case where the conditional inequality is not held, the control flow of this method advances to a step 506. On the other hand, in a case where both the conditional inequalities are held, a frequency counter CB is counted up by one at a step 504. The frequency counter CB indicates the number of times which the conditional inequalities concerning the wheel acceleration DVW is held. At the next step 506, a cycle counter CA for counting the time is counted up by one.

At a step 508, it is judged whether or not the cycle counter CA has reached the predetermined value CA1. In a case where the predetermined value CA1 has not been reached, the control flow advances to a step 522. In a case where the predetermined value CA1 has been reached, the cycle counter CA is cleared to zero at a step 510 succeeding the step 508, and at a step 512 whether or not the frequency counter CB has exceeded the predetermined value CB1 is judged. In a case where, as a result, the predetermined value CB1 has been exceeded, the frequency counter CB is cleared to zero at the next step 514. It is judged by the steps thus far explained if the condition (3-1) is fulfilled.

When it has been detected at a step 516 that the ABS control is proceeding and at a step 518 that the longitudinal acceleration G is greater than the predetermined value A2, the state of the motor vehicle braking on the steep slope is decided at a step 520. In a case where the condition of either of the steps 516 and 518 is not fulfilled, the control flow is directly returned.

At the next step 522, whether or not the ABS control is proceeding is judged again. In a case where, under the ABS control, the longitudinal acceleration G is judged to be less than the predetermined value A3 at the next step 524, the state of the motor vehicle not braking on the steep slope is decided at a step 526. Also, in a case where the ABS control is not proceeding as the judgement of the step 522, the state of the motor vehicle not braking on the steep slope is decided at the step 526.

Further, in a case where the frequency counter CB is not greater than the predetermined number of times CB1 at the step 512, the frequency counter CB is cleared to zero at a step 528, and the state of the motor vehicle not braking on the steep slope is decided at a step 530.

The three sorts of methods of deciding the steep slope state by the use of the G sensor signal as explained above are independent of one another. Accordingly, the certain effect may be produced even when only one of the three methods is employed. It is thought, however, that the general drivers of motor vehicles will undergo various drive situations on steep slopes. Therefore, the effectivities of the first, second and third deciding methods shall be collectively tabulated in FIG. 13 as to the drive situations where the ABS control might be started on account of the braking on the steep slope.

Referring to FIG. 13, mark "○" signifies that the state of the braking on the steep slope can be judged, and that the specified mode can be performed both before and during the ABS control. In addition, mark "Δ" signifies that, although the state can be decided, the specified mode sometimes fails to be performed either before or during the ABS control. Besides, mark "-" signifies that the state itself cannot be decided.

As seen from FIG. 13, most drive situations can be coped with when all the first–third deciding methods are adopted.

Next, there will be explained the braking hydraulic pressure control of the step 212 contained in FIG. 9 which illustrates the main flow of the second aspect of performance.

Figure 14:
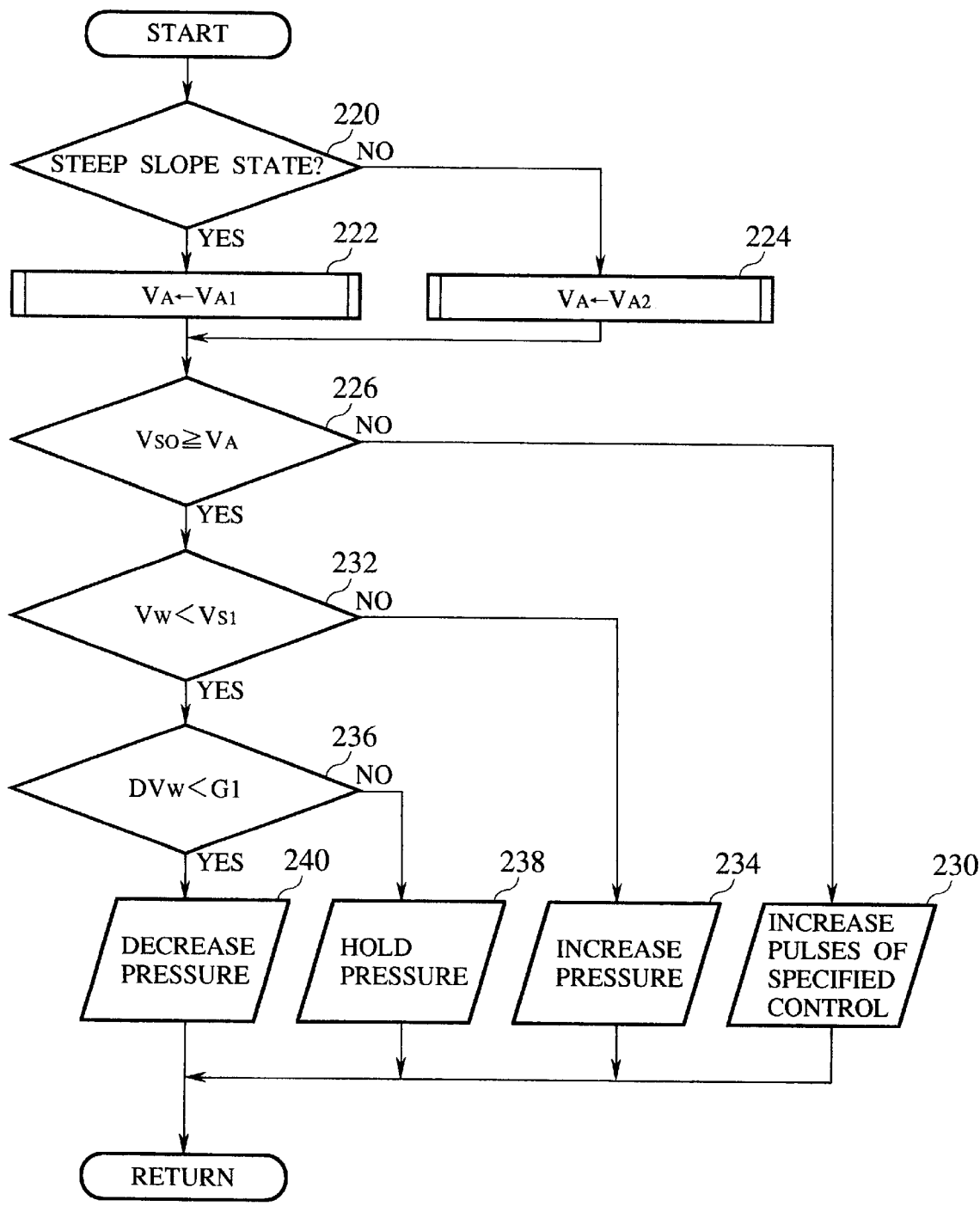
FIG. 14 is a detailed flow chart of a braking hydraulic pressure control in the second aspect of performance.

The detailed flow chart of this braking hydraulic pressure control is illustrated in FIG. 14.

As shown in FIG. 14, this braking hydraulic pressure control is basically the same as the braking hydraulic pressure control of FIG. 7 according to the first aspect of performance ($1^{st}$ embodiment).

In the first aspect of performance (1$^{st}$ embodiment), the decision of the steep slope is rendered in accordance with the turn-ON/OFF of the "L4" signal. In the second aspect of performance (2$^{d}$ embodiment), the decision of any one of the steep slope states determined by the first–third methods is rendered at a step 220. When the steep slope state is decided by any of the first–third deciding methods, the "drive of the motor vehicle on the steep slope" is decided.

At steps 222 and 224, the values of a control starting/ending reference speed VA are changed-over in accordance with the steep slope state in the same manner as in the first aspect of performance. Incidentally, it is to be understood that the process subsequent to the decision at the step 220 may well be the changeover between control starting sensitivities Vsh and Vsn, unlike the changeover between the values of the control starting/ending reference speed VA, as explained in the first aspect of performance.

In a case where the estimative vehicle speed VSO is less than the control starting/ending reference speed VA as the judgement of a step 226, an output for increasing the pulses for the specified control is delivered at a step 230.

The processes of a step 232 succeeding the step 226, et seq. function to perform the usual ABS control (usual mode) similar to that of the first aspect of performance. These steps 232 et seq. corresponding to the steps in FIG. 7 are respectively denoted by numerals having the same two lower digits as in FIG. 7, and they shall not be explained more.

In this manner, according to the second aspect of performance, the decision of the drive on the slope is rendered on the basis of the signal of the G sensor. Therefore, the drive on the slope can be decided before the start of the ABS control, so that the deceleration level of the motor vehicle can be enhanced. Moreover, the braking distance can be shortened, so that the feeling of the drive during braking can be sharply enhanced.

As described above, according to the present invention, the drive of a motor vehicle on a slope can be sensed before the start of an ABS (antilock brake system) control so as to shift the usual mode of the ABS control to the specified mode thereof. Therefore, the optimal specified control conforming to the driving road can be performed from the beginning of the start of the ABS control, and the braking distance of the motor vehicle can be shortened.

What is claimed is:

1. An antilock brake system control apparatus wherein a braking hydraulic pressure is controlled to an appropriate value in accordance with the detection of a wheel slip of a four-wheel drive vehicle, comprising:

slope decision means for determining a drive state of the vehicle on a slope before start of braking; and control changeover means for changing an antilock brake system control to a brake control in which the engagement of the antilock brake system control is restricted, on a basis of the drive state of the vehicle on the slope determined by said slope decision means, wherein said slope decision means determines the drive state of the vehicle on the slope on the basis of a turn-ON signal indicating a vehicle drive status in which both low side gear train and four-wheel drive are selected.

\* \* \* \* \*